United States Patent
Tsuzawa

(10) Patent No.: US 6,243,157 B1
(45) Date of Patent: *Jun. 5, 2001

(54) PHOTOGRAPHIC PRINTER AND PHOTOGRAPHIC PRINTER EXPOSURE METHOD

(75) Inventor: Yoshiyuki Tsuzawa, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,168

(22) Filed: Aug. 18, 1998

(30) Foreign Application Priority Data

Aug. 19, 1997 (JP) ........................................ 9-222165
Aug. 19, 1997 (JP) ........................................ 9-222166

(51) Int. Cl.[7] ............................ G03B 27/52; G03B 27/32
(52) U.S. Cl. ................................................ 355/40; 355/27
(58) Field of Search .................................. 355/27–29, 40, 355/41, 72, 74; 358/75, 80; 347/258.01, 265.01; 399/384

(56) References Cited

U.S. PATENT DOCUMENTS

| | | | | |
|---|---|---|---|---|
| 4,873,547 | * | 10/1989 | Sasaki et al. | 355/316 |
| 4,933,713 | * | 6/1990 | Tsuji et al. | 355/41 |
| 4,968,997 | * | 11/1990 | Saitoh et al. | 346/136 |
| 5,026,037 | * | 6/1991 | Masuda | 271/3.1 |
| 5,081,526 | * | 1/1992 | Yoshikawa | 358/75 |
| 5,160,960 | * | 11/1992 | Ibuchi et al. | 355/27 |
| 5,181,066 | * | 1/1993 | Ozawa et al. | 355/29 |
| 5,375,494 | * | 12/1994 | Kajita et al. | 83/210 |
| 5,430,522 | * | 7/1995 | Kobayashi et al. | 355/27 |
| 5,504,555 | * | 4/1996 | Yamamoto | 355/29 |
| 5,731,888 | * | 3/1998 | Arai | 359/204 |
| 5,734,461 | * | 3/1998 | Ishikawa et al. | 355/40 |
| 5,758,247 | * | 5/1998 | Yanashima et al. | 399/384 |
| 5,769,299 | * | 6/1998 | Negoro | 226/24 |
| 5,870,175 | * | 2/1999 | Nakaya | 355/40 |

* cited by examiner

Primary Examiner—Russell Adams
Assistant Examiner—Hung Henry Nguyen
(74) Attorney, Agent, or Firm—Sughrue, Mion, Zinn, Macpeak & Seas, PLLC

(57) ABSTRACT

There is provided a photographic printer for transporting a photosensitive material in a reverse direction thereby improving the processing performance without wasting the photosensitive material, and a photographic printer exposure method. During automatic loading of the photographic paper (54) from the paper magazine (64) and during the paper replenishment, the gear train (132) is interrupted by an electromagnetic clutch (134) so that the second pair of transporting rollers (34) are freely rotatable. The first pair of transporting rollers (32) feeds the photographic paper from the paper magazine towards the exposure sections (26) and (28) by the driving force of motor (112). The freely rotatable second pair of transporting rollers, disposed between the first pair of transporting rollers and the exposure sections and guide the photographic paper. When a reverse transporting operation for rewinding the photographic paper is needed, the clutch and the solenoid of the electromagnetic clutch are simultaneously switched over, so that the driving force of motor (112) is transmitted to the second pair of transporting rollers via the second gear (120) and the gear train (132). As a result, the second pair of transporting rollers are rotated by motor (112) while the roller (68A) is rotated by motor (142), so that the photographic paper is transported toward the first pair of transporting rollers (32).

13 Claims, 11 Drawing Sheets

PHOTOGRAPHIC PRINTER AND PHOTOGRAPHIC PRINTER EXPOSURE METHOD

BACKGROUND OF THE INVENTION

1. Field of the Invention

The present invention relates to a photographic printer with an improved processing performance enabling no waste of photosensitive material, and to a photographic printer exposure method.

2. Description of the Related Art

There is a well known technique of temporarily storing image data of each frame of a negative film scanned by a scanner in an image memory, and reading the image data from the image memory and displaying it on a liquid crystal panel, and thus, exposing the displayed images, equivalent to several frames, on photographic paper which is used as a photosensitive material.

Moreover, there has been developed a photographic printer which can make an index print. The index print is made in such a way that each frame is arranged in a matrix using the image memory and the liquid crystal panel, and then, is scaled-down and printed, and thus, it is possible to readily check what photographs were taken in a roll of developed negative film.

The photographic printer is provided with a conventionally existing primary exposure section for directly exposing an image recorded on a negative film onto a photographic paper, and a secondary exposure section for exposing an image stored in an image memory onto the photographic paper. These primary and secondary exposure sections are arranged parallel with each other along a feeding path of the photographic paper. The index print is arranged on the photographic paper rearward of all the frames of the negative film.

In the primary exposure section, various size prints are made. For this reason, when exposing an ordinary size print in the final frame, there is a gap between the final frame and the index print, in essence wasting the photographic paper in this gap portion.

Accordingly, when making an index print, for example, of six exposures that make up a sheet of an index print, two or three exposures are printed before the final frame exposure, and the final frame is then printed. Thereafter, the remaining portion of the index print is exposed, resulting in there being no waste of the photographic paper.

However, when starting the exposure of the index print after the final frame has been exposed, it is possible to perform replacement processing of a negative film during the exposure of an index print, so that processing performance can be improved. This serves to improve the performance of the photographic printer when carrying out continuous processing. Namely, in order to improve processing performance without wasting the photographic paper, it is very effective to enable the photosensitive material to be transported in reverse so that the exposure of the indexprint is started after the final frame has been previously exposed.

SUMMARY OF THE INVENTION

The present invention has been made taking the above-mentioned circumstances into consideration. Therefore, an object of the present invention is to provide a photographic printer which can transport a photosensitive material in reverse by the use of a drive source for automatically loading and rewinding a photosensitive material so as to improve the processing performance without wasting the photosensitive material, and can prevent a reduction in the precision with which the photosensitive material is fed during reverse transporting, and photographic printer exposure method thereof.

The first aspect of the present invention provides a photographic printer, having a first exposure section which exposes images recorded on a negative film onto a long photosensitive material fed from a magazine, and a second exposure section situated on the upstream side in the transporting direction of the photosensitive material from the first exposure section which exposes the images stored in memory onto the photosensitive material, comprising a drive source which generates a driving force for feeding the photosensitive material; a first pair of transporting rollers which feed the photosensitive material from the magazine to the exposure sections through the driving force of the drive source; a second pair of transporting rollers which are disposed between the first pair of transporting rollers and the exposure sections so as to hold the photosensitive material, and freely rotates with respect to the photosensitive material fed from the first pair of transporting rollers toward the exposure sections while being rotated by the drive source and transporting the photosensitive material so that the photosensitive material is returned toward the first pair of transporting rollers; and a third pair of transporting rollers which are situated on the downstream side in the transporting direction of the photosensitive material from the exposure sections so as to hold the photosensitive material.

The second aspect of the present invention provides a photographic printer according to the first aspect, wherein the nip pressure of the third pair of transporting rollers is higher than that of the second pair of transporting rollers.

The third aspect of the present invention provides a photographic printer according to the first aspect, wherein the photographic printer further includes a gear train which is provided between the drive source and the second pair of transporting rollers and transmits the driving force from the drive source to the second pair of transporting rollers.

The fourth aspect of the present invention provides a photographic printer according to the third aspect, wherein the nip pressure of the third pair of transporting rollers is higher than that of the second pair of transporting rollers.

The fifth aspect of the present invention provides a photographic printer according to the third aspect, wherein the photographic printer further includes a motor used as the drive source, and a clutch which is provided in the gear train and stops the transmission of the driving force.

The sixth aspect of the present invention provides the photographic printer according to the fifth aspect, wherein the nip pressure of the third pair of transporting rollers is higher than that of the second pair of transporting rollers.

The seventh aspect of the present invention provides a photographic printer, having a first exposure section which exposes images recorded on a negative film onto a long photosensitive material fed from a magazine, and a second exposure section situated on the upstream side in the transporting direction of the photosensitive material from the first exposure section and which exposes the images stored in memory onto the photosensitive material, comprising a second pair of transporting rollers which is situated on the upstream side in the transporting direction of a photosensitive material with respect to the exposure sections so as to hold the photosensitive material; and a third pair of transporting rollers which is situated on the downstream side in the transporting direction of the photosensitive material with respect to the exposure sections so as to hold the photosensitive material.

The eighth aspect of the present invention provides the photographic printer according to the seventh aspect, wherein the nip pressure of the third pair of transporting rollers is higher than the nip pressure of the second pair of transporting rollers.

The ninth aspect of the present invention provides a photographic printer exposure method, which is applied to a photographic printer having a first exposure section which exposes images recorded on a negative film onto a long photosensitive material fed from a magazine, and a second exposure section situated on the upstream side in the transporting direction of the photosensitive material from the first exposure section which exposes the images stored in memory onto the photosensitive material, comprising the steps of transporting the photosensitive material in the transporting direction of the photosensitive material while successively exposing frames of a negative film onto the photosensitive material in the first exposure section; subsequently transporting the photosensitive material in the reverse direction to the transporting direction of the photosensitive material; and exposing the images stored in the memory in the second exposure section onto a region of the photosensitive material adjacent to a region thereof exposed in the first exposure section.

The tenth aspect of the present invention provides a photographic printer exposure method, which is applied to a photographic printer having a first exposure section which exposes images recorded on a negative film onto a long photosensitive material fed from a magazine, a second exposure section situated on the upstream side in the transporting direction of the photosensitive material from the first exposure section which exposes the images stored in memory onto the photosensitive material, a second pair of transporting rollers provided between the magazine and the second exposure section, and a third pair of transporting rollers provided on the downstream side from the first exposure section, comprising the steps of transporting the photosensitive material in the transporting direction of the photosensitive material while successively exposing frames of a negative film onto the photosensitive material in the first exposure section; subsequently transporting the photosensitive material in the reverse direction to the transporting direction of the photosensitive material by starting the driving action of the third pair of transporting rollers having a nip pressure higher than that of the second pair of transporting rollers after the driving action of the second pair of transporting rollers starts; subsequently stopping the driving action of the second pair of transporting rollers after stopping the driving action of the third pair of transporting rollers after the unexpected region of the photosensitive material has been transported past the second exposure section, and thereafter stopping the transporting of the photosensitive material; subsequently transporting in the original direction the same length of photosensitive material as was transported past the second exposure section, and thereafter, stopping the transporting of the photosensitive material; and exposing in the second exposure section the images stored in the memory onto a region of the photosensitive material adjacent to a region thereof exposed in the first exposure section.

The following is a description of an operation of the photographic printer according to the first aspect.

The photographic printer according to the first aspect comprises a first exposure section for exposing the images recorded on the negative film onto the long photosensitive material fed from a magazine, a second exposure section for exposing the images stored in the memory onto the photosensitive material, and a drive source for generating a driving force which transports the photosensitive material.

Further, the second pair of transporting rollers, which are situated on the upstream side in the transporting direction of a photosensitive material with respect to the exposure sections so as to hold the photosensitive material, is rotated, and the third pair of transporting rollers, which are situated on the downstream side in the transporting direction of the photosensitive material with respect to the exposure sections so as to hold the photosensitive material, is rotated.

The first pair of transporting rollers feed the photosensitive material from the magazine to the exposure sections by the driving force of the drive source, and then, the second pair of transporting rollers freely rotates so as to guide the photosensitive material. Further, when necessary, the second pair of transporting rollers are rotated by the drive source, and then, transports the photosensitive material in the reverse direction back towards the first pair of transporting rollers.

Because the drive source, which rotates the first pair of transporting rollers to autoload and autorewind the photosensitive material, is able to be used to rotate the second pair transporting rollers so that the photosensitive material is transported in the reverse direction, there is no need to provide an additional drive source for the reverse transportation.

Therefore there is no need to provide a space to dispose a new drive source and a new circuit board for controlling the drive source, so that miniaturization and cost reduction can be achieved in the photographic printer.

The following is a description of an operation of the photographic printer according to the second aspect.

The photographic printer according to the second aspect is operated in the same way as in the first aspect. In the photographic printer according to the second aspect, the nip pressure of the downstream side pair of transporting rollers is set higher than that of the upstream side pair of transporting rollers. More specifically, the photographic printer according to the second aspect has the second pair of transporting rollers provided between the magazine and the second exposure section and the third pair of transporting rollers provided on the downstream side of the first exposure section, and the nip pressure of the third pair of transporting rollers is set higher than that of the second pair of transporting rollers.

Therefore, when the photosensitive material is transported in the reverse direction to the transporting direction of the photosensitive material from the first exposure section toward the second exposure section situated on the upstream side in the transporting direction of the photosensitive material, the driving action of the second pair of transporting rollers starts, and thereafter, the driving action of the third pair of transporting rollers starts so as to transport the photosensitive material. And then, once the photosensitive material has been transported past the second exposure section, the third pair of transporting rollers are stopped, and thereafter, the second pair of transporting rollers are stopped so as to interrupt the transporting of the photosensitive material.

Further, it is possible to transport in the original direction the same length of photosensitive material as was transported past the second exposure section.

More specifically, the nip pressure of the third pair of transporting rollers is set higher than that of the second pair of transporting rollers. Further, when transporting the photosensitive material in the original transporting direction, the driving action of the second pair of transporting rollers starts prior to that of the third pair of transporting rollers, and when the transporting of the photosensitive material is stopped, the third pair of transporting rollers are stopped prior to the second pair of transporting rollers.

Therefore, the photosensitive material is not loosened, and slides over the second pair of transporting rollers. Thus, no load is applied to the photosensitive material, and by controlling the rotating rate of the third pair of transporting rollers, it is possible to control the transporting rate of the photosensitive material.

Further, the same length of photosensitive material as was transported past the second exposure section is finally transported in the original direction. Thus, it is possible to prevent the precision of the reverse transporting of the photosensitive material from being lowered.

The following is a description of an operation of the photographic printer according to the third aspect. The photographic printer according to the third aspect is operated in the same way as in the first aspect. In the photographic printer according to the third aspect, the gear train for transmitting the driving force from the drive source to the second pair of transporting rollers is disposed between the drive source and the second pair of transporting rollers. Thus, it is possible to readily transmit the driving force to the second pair of transporting rollers without changing the location of the drive source. Further, the transmission of the driving force can be securely achieved as compared with when the driving force is transmitted by means of a belt.

The photographic printer according to the fourth aspect is operated in the same way as in the third aspect. In addition, in the photographic printer according to the fourth aspect, the nip pressure of the downstream side pair of transporting rollers is set higher than that of the upstream side pair of transporting rollers. Thus, the photographic printer according to the fourth aspect has the same effect as is described for the photographic printer according to the second aspect.

The following is a description on an operation of the photographic printer according to the fifth aspect.

The photographic printer according to the fifth aspect is operated in the same say as in the third aspect. In the photographic printer according to the fifth aspect, a motor which generates the driving force is used as the drive source. Thus, it is possible to easily control the driving of the second pair of transporting rollers.

Moreover, a clutch is provided in the gear train, and it is possible to arbitrarily interrupt the transmission of driving force. Consequently, when the transporting rollers transport the photosensitive material from the magazine to the exposure section, the clutch can be engaged to interrupt the transmission of the rotation so that the gear train itself does not put any weight on the driving force.

The photographic printer according to the sixth aspect is operated in the same way as in the fifth aspect. In addition, in the sixth aspect, the nip pressure of the third pair of transporting rollers is set higher than that of the second pair of transporting rollers. Thus, the photographic printer according to the sixth aspect has the same effect as is described for the photographic printer according to the second aspect.

The photographic printer according to the seventh aspect comprises: a first exposure section exposing images recorded on a negative film onto a long photosensitive material fed from a magazine; a second exposure section situated on the upstream side in the feeding direction of the photosensitive material from the first exposure section which exposes the images stored in memory onto the photosensitive material; a second pair of transporting rollers which are situated between the magazine and the second exposure section; and a third pair of transporting rollers which are situated on the downstream side in the feeding direction of the photosensitive material with respect to the exposure sections.

In the photographic printer according to the seventh aspect, the frames of the negative film are successively exposed in the first exposure section while the photosensitive material is transported along the transporting direction of the photosensitive material, and thereafter, the photosensitive material is transported in the reverse direction to the transporting direction.

Thereafter, in the second exposure section, the images stored in the memory are exposed onto a region on the photosensitive material adjacent to the region exposed in the first exposure section.

Accordingly, once the final frame on the negative film has been exposed in the first exposure section, it is possible to transport the photosensitive material in the reverse transporting direction so that exposure of the images stored in the memory can be started in the second exposure section without any gap being created between the final frame and the images stored in the memory which, in this case, are the images constituting the index print. Thus, it is possible to improve the processing performance of the photographic printer without wasting the photosensitive material.

The photographic printer according to the eighth aspect is operated in the same way operation as in the seventh aspect. In the eighth aspect, the nip pressure of the third pair of transporting rollers is set higher than that of the second pair of transporting rollers. Thus, the photographic printer according to the eighth aspect has the same effect as is described for the photographic printer according to the second aspect.

The following is a description on an operation of the photographic printer exposure method according to the ninth aspect.

The photographic printer exposure method according to the ninth aspect is applied to the photographic printer having a first exposure section which exposes images recorded on a negative film onto a long photosensitive material fed from a magazine, and a second exposure section situated on the upstream side in the transporting direction of the photosensitive material from the first exposure section which exposes the image stored in memory onto the photosensitive material.

First, the frames of the negative film are successively exposed in the first exposure section while the photosensitive material is transported in the photosensitive material transporting direction, and thereafter, the photosensitive material is transported in the reverse direction to the original transporting direction.

Thereafter, in the second exposure section, the images stored in the memory are exposed onto a region on the photosensitive material adjacent to the region exposed in the first exposure section.

Accordingly, once the final frame on the negative film has been exposed in the first exposure section, it is possible to transport the photosensitive material in the reverse transporting direction so that exposure of the images stored in the memory can be started in the second exposure section without any gap being created between the final frame and the images stored in the memory which, in this case, are the images constituting the index print. Thus, it is possible to improve the processing performance of the photographic printer without wasting the photosensitive material.

The following is a description on an operation of the photographic printer exposure method according to the tenth aspect.

The photographic printer exposure method according to the tenth aspect is operated in the same way as in the ninth aspect. In the tenth aspect, the photographic printer comprises the second pair of transporting rollers provided between the magazine and the second exposure section, and the third pair of transporting rollers located on the downstream side of the first exposure section.

Therefore, when the photosensitive material is transported in the reverse direction to the photosensitive material transporting direction, namely from the first exposure section toward the second exposure section situated on the upstream side in the feeding direction of the photosensitive material, the driving action of the second pair of transporting rollers starts, and thereafter, the driving action of the third pair of transporting rollers starts so as to transport the photosensitive material. And then, once the photosensitive material has been transported past the second exposure section, the third pair of transporting rollers are stopped, and thereafter, the second pair of transporting rollers are stopped so as to interrupt the transporting of the photosensitive material.

Further, it is possible to transport in the original direction the same length of photosensitive material as was transported past the second exposure section.

Therefore, the photosensitive material is not loosened, and slides over the second pair of transporting rollers. Thus, no load is applied to the photosensitive material, and by controlling the rotating rate of the third pair of transporting rollers, it is possible to control the transporting rate of the photosensitive material.

Further, because the same length of photosensitive material was transported past the second exposure section is finally transported in the original direction, it is possible to prevent the precision of the reverse transporting of the photosensitive material from being lowered.

As can be seen from the above description, the photographic printer exposure method according to the tenth aspect is applied to the photographic printer according to the first through eighth aspects so as to feed the photosensitive material in reverse, whereby the same operation as the photographic printer according to the first to eighth aspects is obtained. Hence, it is possible to improve the processing performance of the photographic printer without wasting the photosensitive material, and to prevent the precision of the reverse transporting of the photosensitive material from being lowered.

DETAILED DESCRIPTION OF THE INVENTION

An embodiment of the present invention will be described below with reference to the accompanying drawings.

Figure 1:
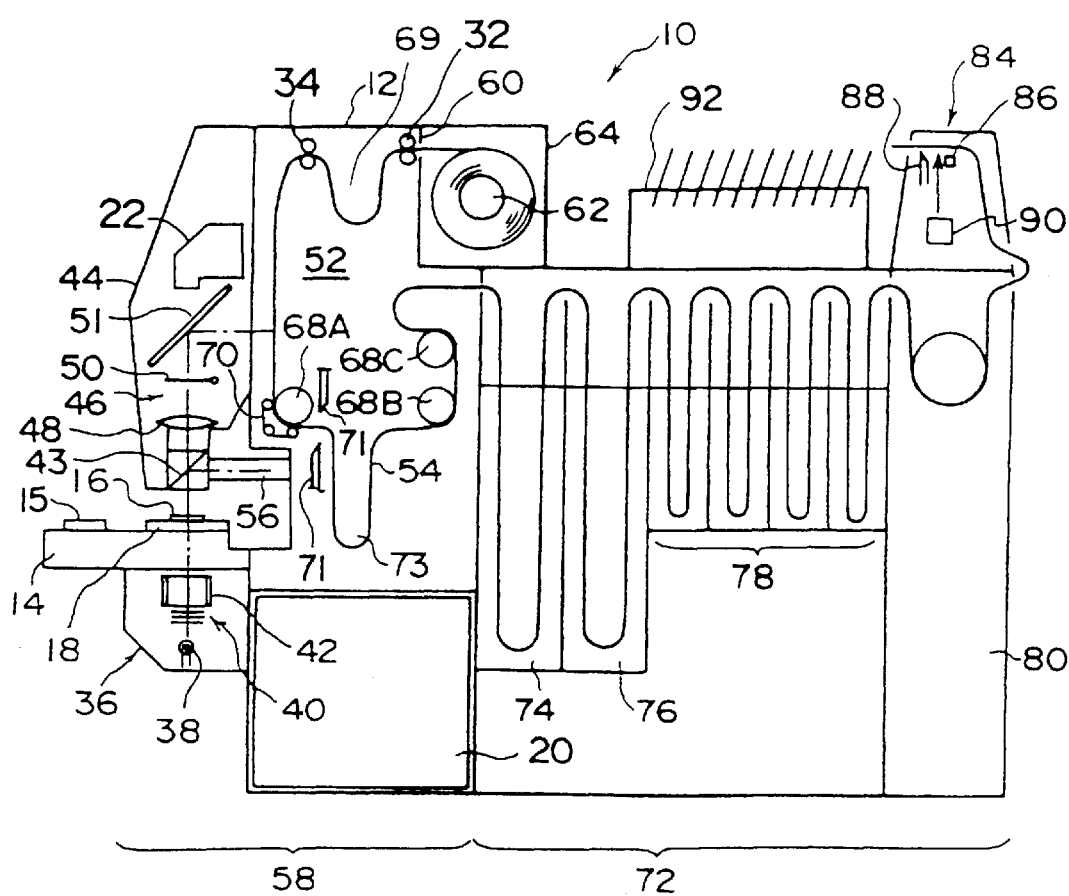
FIG. 1 is a schematic structural diagram showing a printer processor according to an embodiment of the present invention.
Figure 2:
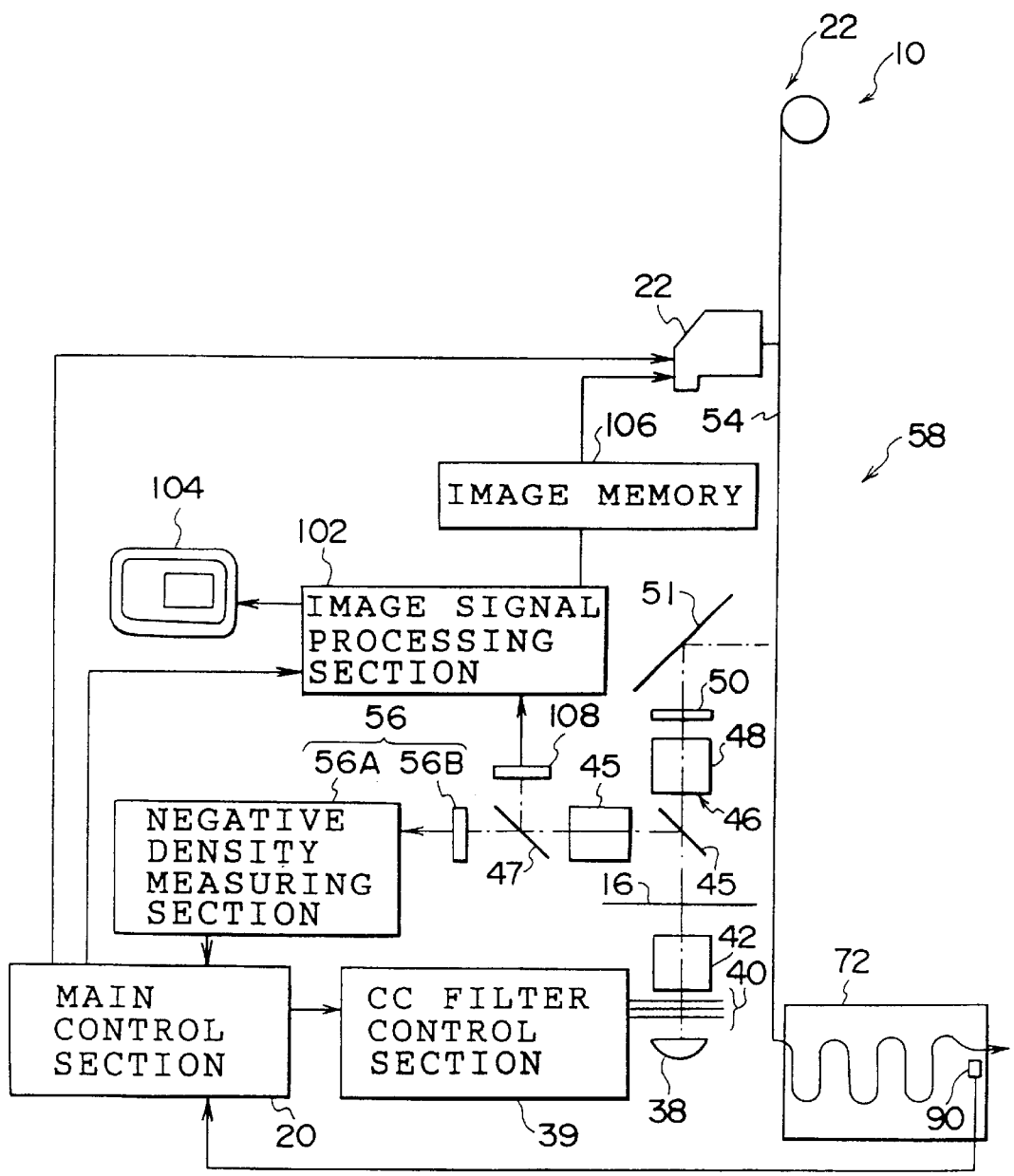
FIG. 2 is a block diagram showing the construction of the printer section of the printer processor according to an embodiment of the present invention.
Figure 3:
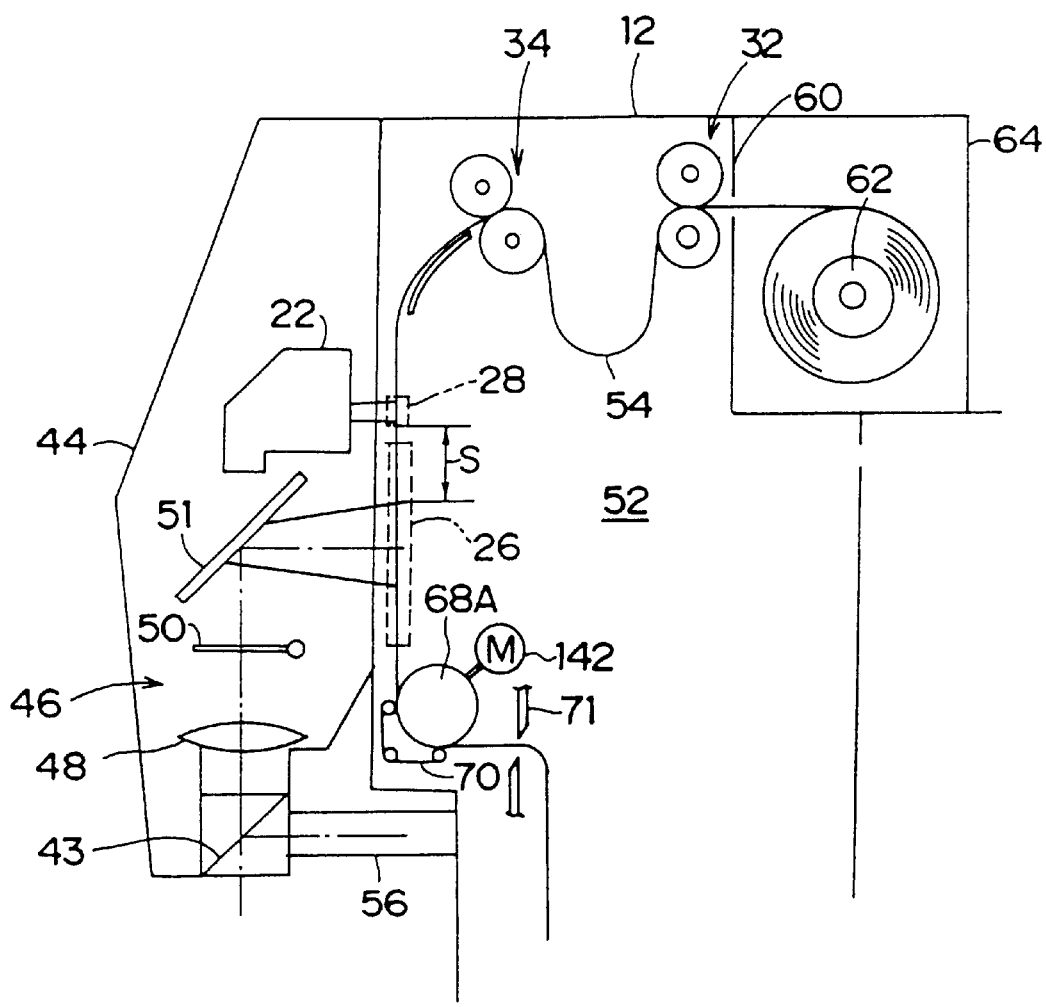
FIG. 3 is an enlarged view of the principal parts of the printer section of the printer processor according to an embodiment of the present invention.

With reference to FIG. 1 to FIG. 3, the construction of a printer processor 10 which is a photographic printer according to an embodiment of the present invention will be described. The external portion of the printer processor 10 is covered with a casing 12. Further, the printer processor 10 comprises a printer section 58 and a processor section 72. The printer section 58 carries out an exposure of the main prints and the index print which is the sub print onto a photographic paper; on the other hand, the processor section 72 carries out various processes such as development, fixation, washing, and drying of the exposed photographic paper.

First, the following is a description of the construction of the printer section 58. The printer processor 10 is provided with a working table 14 projecting from the casing 12 on the left-hand side of FIG. 1. A negative carrier 18 and a keyboard 15 are arranged on the upper surface of the working table 14. A negative film 16 is set on the negative carrier 18, and the keyboard 15 is used for inputting commands, data, and the like by an operator.

A first exposure light source section 36 is provided below the working table 14. The first exposure light source section 36 is provided with a light source 38, and a light emitted from the light source 38 is supplied to the negative film 16 set on the negative carrier 18 via a color correction filter (hereinafter, referred to simply as "CC filter) 40 and a diffusion cylinder 42. The CC filter 40 comprises three filters, namely, C (Cyan), M (Magenta) and Y (Yellow) filters. The operation of these filters is controlled by a CC filter control section 39. The filters may be inserted in various configurations along the optical axis of the light emitted from the light source 38.

A cover 44 is disposed on the downstream side (upper side in FIG. 1) of the negative carrier 18. The cover 44 is provided with a first exposure optical system 46, and a second exposure optical section 22 for carrying out an exposure of the sub print such as an index print.

A half-silvered mirror 43 is disposed on the lowest portion of the first exposure optical system 46, and a light transmitted through the negative film 16 set on the negative carrier 18 reaches to the half-silvered mirror 43. Further, an exposure lens 48 and a black shutter 50 are successively disposed on the downstream side of an optical path transmitting through the half-silvered mirror 43. The exposure lens 48 changes the magnification of an exposing image, and the black shutter 50 shields an exposure light. A mirror 51 for reflecting the exposure light in a substantially right angle direction is disposed on the downstream side of the black shutter 50. The exposure light reflected by the mirror 51 is irradiated onto a photographic paper 54 which is a photosensitive material set in an exposure room 52, and thereby, the photographic paper 54 is exposed.

Meanwhile, a photometry lens 45 for changing the magnification of a photometry image is disposed on the downstream side of the optical path reflected by the half-silvered mirror 43, and a half-silvered mirror 47 is disposed on the downstream side of the photometry lens 45. A scanner 108, which comprises an image sensor or the like, is disposed in the direction where the light is reflected by the half-silvered mirror 47. The scanner 108 is connected to an image signal processing section 102 which carries out predetermined image processing on the image data of each frame of the negative film 16 scanned by the scanner 108.

The image signal processing section 102 is connected to a simulator 104 which functions as an image display device. The simulator 104 displays a print simulation image relative to each frame of the negative film 16, which is prepared on the basis of preset conditions.

Further, the image signal processing section 102 is connected to an image memory 106 for storing image data. The image signal processing section 102 stores the image data for each three color component of each frame of the negative film 16 scanned by the scanner 108 in the image memory 106.

A negative density measuring section 56 is provided on the downstream side of the optical path transmitting through the half-silvered mirror 47. The negative density measuring section 56 measures the image density of each frame of the negative film 16. Further, the negative density measuring section 56 is provided with a scanner 56B comprising an image sensor or the like, and a negative density measuring device 56A which measures the image density of each frame of the negative film 16 scanned by the scanner 56B.

Figure 4:
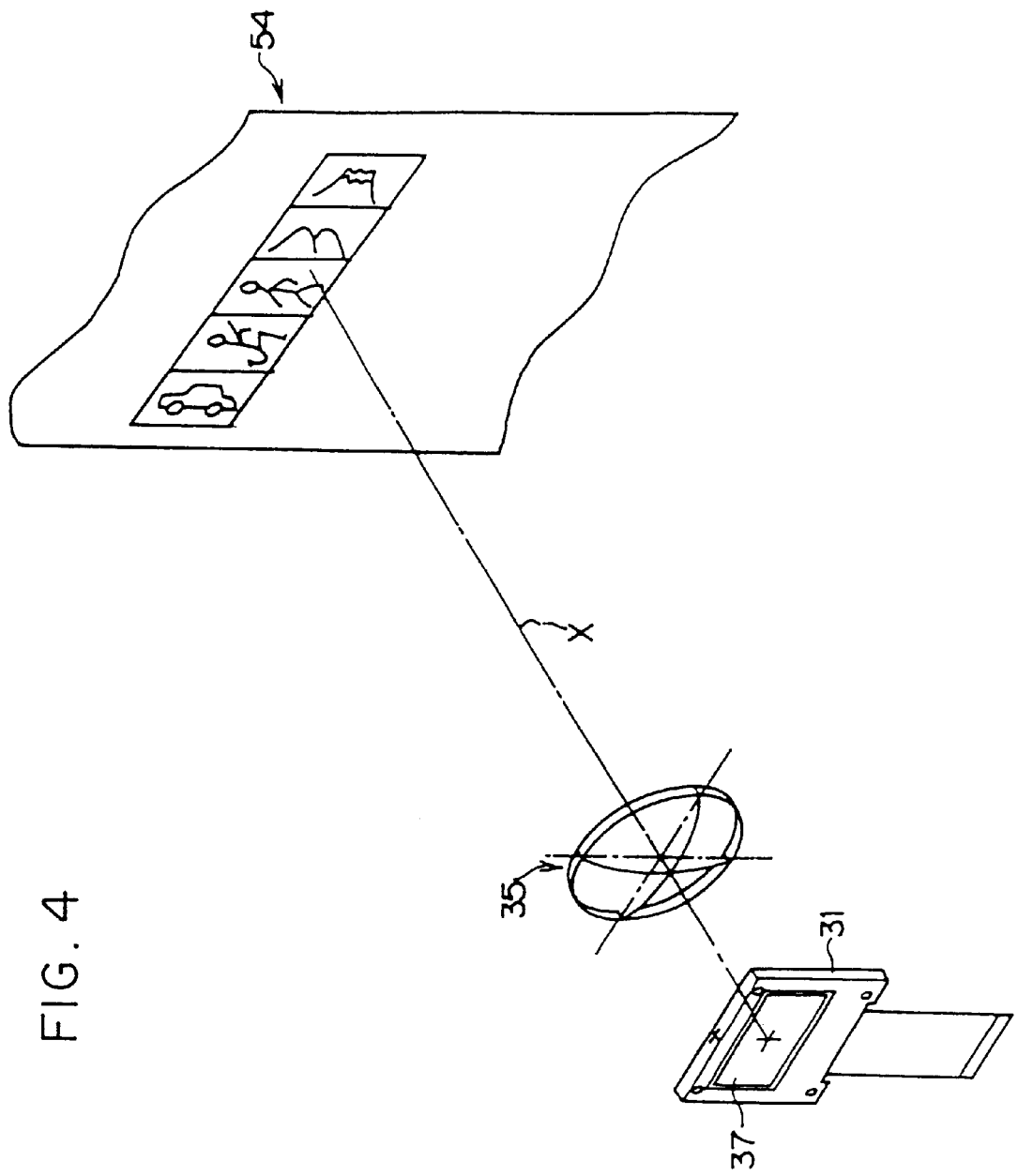
FIG. 4 is a perspective view of the disposition of the liquid crystal panel and exposure lens of the printer processor according to an embodiment of the present invention.
Figure 6:
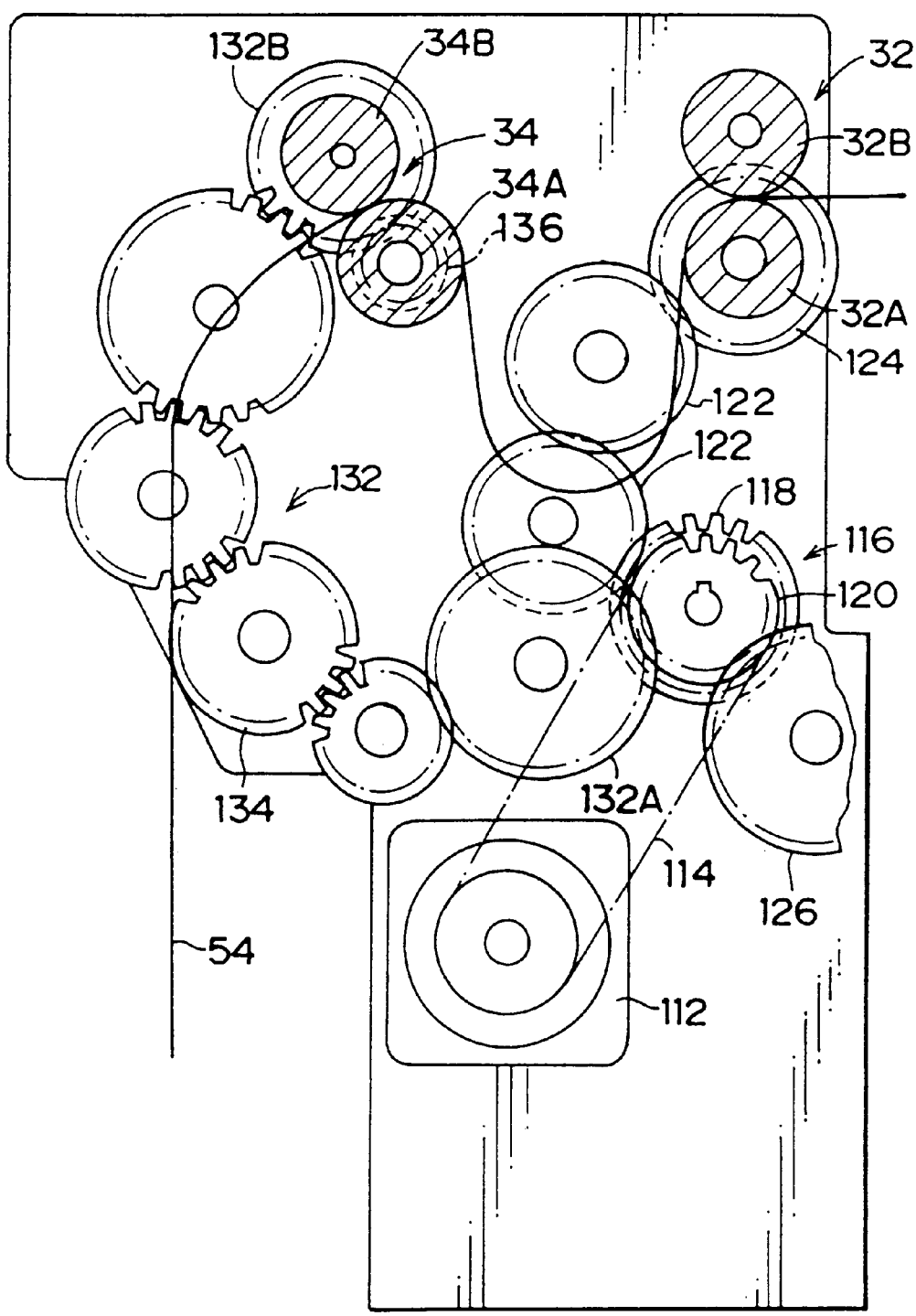
FIG. 6 is an enlarged view of the principal parts of the drive system of the pair of transporting rollers according to an embodiment of the present invention.

On the other hand, the second exposure optical section 22 is provided with a light emitting diode (not shown) which functions as an exposure light source for index print, and a liquid crystal panel 31, FIG. 6. An image display screen 37 (see FIG. 4) of the liquid crystal panel 31 has a multitude of regularly arranged pixels (not shown) which are capable of displaying a white color, a black color and 256 gradations of intermediate colors between the two through an electrical means.

Moreover, an exposure lens 35 for changing the magnification of an image of an index print is disposed at a position adjacent to the liquid crystal panel 31. Also, the liquid crystal panel 31 is connected to a control section (not shown) which monitors and controls various processing in the second exposure optical section 22.

With the aforesaid construction, the second exposure optical section 22 reads out the image data of each frame of the negative film stored in the image memory 106, and then forms a unit of index image data which has the frame images disposed according to predetermined rules. Thus, the second exposure optical section 22 can display several predetermined frames of the formed unit of index image data, for example, images corresponding to the image data equivalent to five frames (one row), on the liquid crystal panel 31.

As shown in FIG. 3, a first exposure section 26 for exposing an image recorded on the negative film 16 onto the photographic paper 54 is provided at a position facing the first exposure optical system 46 in the exposure room 52. Further, a second exposure section 28 for exposing images stored in the image memory 106 onto the photographic paper 54 is provided at a position facing the second exposure optical section 22 in the exposure room 52. Namely, in the exposure room 52, the second exposure section 28 and the first exposure section 26 are disposed in order from the top. However, considering that the first exposure section 26 makes prints of various sizes, a space S exists between the edge of an ordinary size print in the first exposure section 26 and the end of the second exposure section 28.

A main control section 20, which controls and monitors the whole of the printer processor 10, is provided below the exposure room 52. The main control section 20 comprises a CPU, RAM, ROM, an input/output controller and the like, which are not shown. Further, the main control section 20 is connected to the above-described CC filter control section 39, the negative density measuring device 56A, the image signal processing section 102 and the control section, and monitors and controls each operation of these devices.

As shown in FIG. 1 and FIG. 3, an attachment portion 60 is provided at a corner portion on the upper surface of the casing 12. The attachment portion 60 contains a paper magazine 64 which houses the photographic paper 54 wound in multiple layers around a reel 62.

Figure 5:
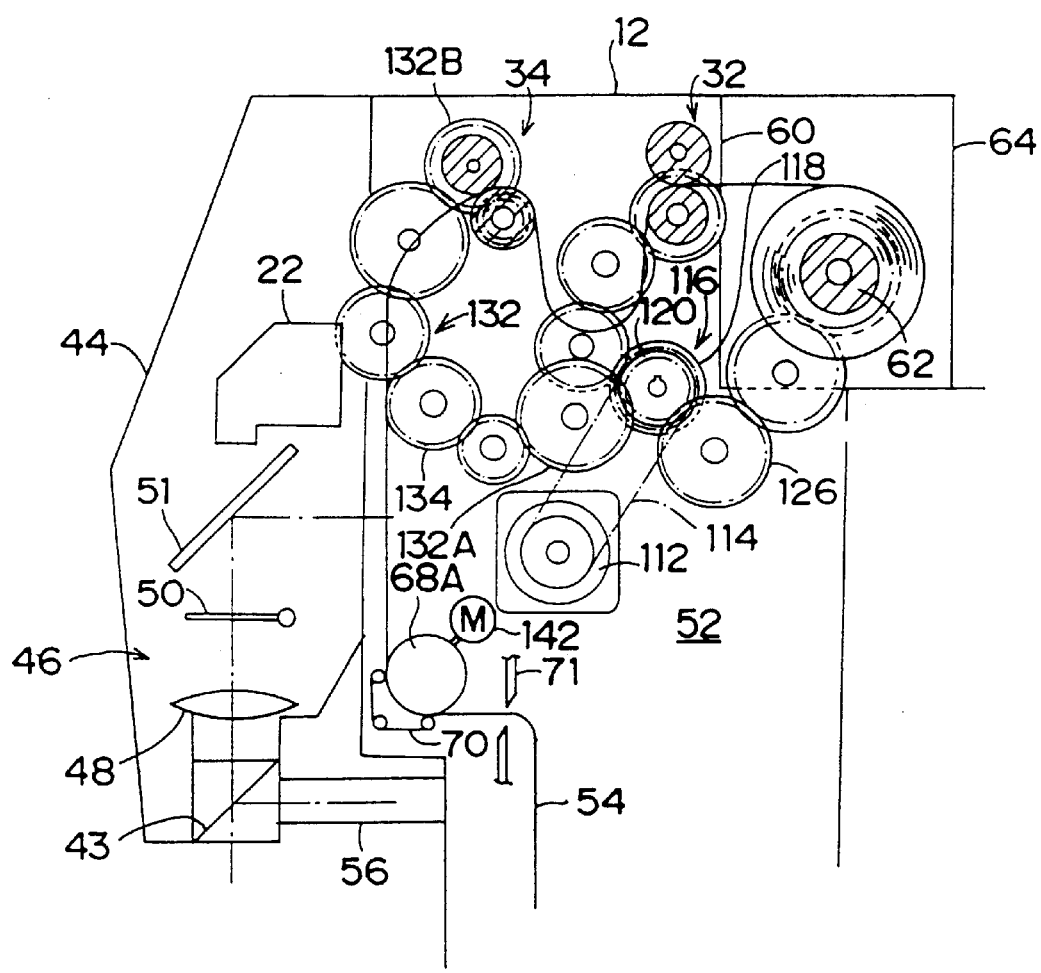
FIG. 5 is an enlarged view of the principal parts of the printer section of the printer processor according to an embodiment of the present invention showing the drive system of a pair of transporting rollers.

As shown in FIG. 5 and FIG. 6, a motor 112, which is an upstream side drive source, is provided in the vicinity of the attachment portion 60. The motor 112 has one end of the endless belt 114 wound around it and generates a driving force. A clutch 116, which can engage or disengage the transmission of the driving force by means of a solenoid (not shown), is disposed at the other end of the endless belt 114.

More specifically, the clutch 116 has a first gear 118 and a second gear 120 which are coaxially situated attached thereto. Either the first gear 118 or the second gear 120 can be selectively rotated by the driving force of the motor 112 through the solenoid operation.

Meanwhile, a first pair of transporting rollers 32 comprise an upper roller 32B and a lower roller 32A. A drive gear 124 is located coaxially with the lower roller 32A so as to be rotated integrally with the lower roller 32A. The driving force of the motor 112 is transmitted to the driven gear 124 from the first gear 118 via intermediate gear 122.

For this reason, when the clutch 116 is disengaged so that the first gear 118 is rotated, the first pair of transporting rollers 32 is rotated by the drive of the motor 112, and then the photographic paper 54 is fed from the paper magazine 64 towards the sections 26 and 28 by the driving force of the motor 112 while being held between upper and lower rollers 32B and 32A.

The second gear 120 of the clutch 116 is engaged with the magazine gear 126 and the leading gear 132A which is a gear on the leading end side of the gear train 132. The magazine gear 126 is constructed so as to transmit a driving force to the reel 62 around which the photographic paper 54, stored in the paper magazine 64, is wound. Also, the gear train 132 is composed of a plurality of mutually engaged gears, inclusive of the leading gear 132A.

An electromagnetic clutch 134 which also serves as a gear is arranged midway in the gear train 132. The electromagnetic clutch 134 can be removed in an axial direction (the direction perpendicular to the diagram paper) by a built-in solenoid between a position where a driving force is transmitted and a position where no driving force is transmitted.

A second pair of transporting rollers 34 comprise an upper roller 34B and a lower roller 34A. The second pair of transporting rollers 34 is an upstream side pair of transporting rollers for guiding the photographic paper 54 while holding it between the upper and lower rollers 34B and 34A. Further, the second pair of transporting rollers 34 is situated on an upstream side in the transporting direction of the photographic paper 54 with respect to the exposure sections 26 and 28. The nip pressure for holding the photographic paper 54 maintained by the second pair of transporting rollers 34 is 2 Kgf/mm$^2$.

An end gear 132B, which is the gear on the end of the gear train 132, is located coaxially with the upper roller 34B so as to rotate integrally with the lower roller 34A of the second pair of transporting rollers 34. With the rotation of the end gear 132B, the second pair of transporting rollers 34 is driven and rotated.

The lower roller 34A is provided with a one-way clutch 136 which transmits a driving force in one direction only. Thus, when a driving force is transmitted to the support shaft of the lower roller 34A in a clockwise rotating direction, an outer circumferential surface of the lower roller 34A is rotated integrally with the one-way clutch 136. However, the driving force is not transmitted in a counterclockwise rotating direction, so that the lower roller 34A can be freely rotated.

With the construction as described above, the first pair of transporting rollers 32 is disposed in the vicinity of the attachment portion 60 as shown in FIG. 3. The photographic paper 54 is held by means of the pair of transporting rollers 32, and then, is fed into the exposure room 52 in a horizontal state. Further, the photographic paper 54 is passed through the second pair of transporting rollers 34 arranged between the first pair of transporting rollers 32 and the exposure sections 26 and 28, and then, its direction is changed by 90° so that it hangs down.

Incidentally, a first stock section 69 for guiding the photographic paper 54 in a substantially letter U is provided between the first pair of transporting rollers 32 and the second pair of transporting rollers 34.

Rollers 68A, 68B, and 68C are disposed below the exposure sections 26 and 28 in the exposure room 52. The transporting direction of the photographic paper 54, on which the image of the negative film 16 is printed in the exposure room 52, is changed by 90° by each of the rollers 68A, 68B, and 68C, and then the photographic paper 54 is fed to a processor section 72 which will be described later.

The third transporting roller 68A, which is a transporting roller on the downstream side, is connected so as to be rotated by a motor 142 which is a downstream side drive source for generating a driving force. Moreover, a friction belt 70 is rotatably located in a position adjacent to the roller 68a and the photographic paper 54. Thus, the photographic paper 54 is held between the roller 68A and the friction belt 70 so that the driving force of the roller 68A can be securely transmitted to the photographic paper 54.

More specifically, the roller 68A is situated on the downstream side in the transporting direction of the photographic paper 54 from the exposure sections 26 and 28 so as to hold the photographic paper 54. In this case, the nip pressure for holding the photographic paper 54 between the roller 68A and the friction belt 70 is set to 7 Kgf/mm$^2$. Therefore, the nip pressure is set higher than the nip pressure of the second pair of transporting rollers 34 so that the photographic paper 54 readily slides across the second pair of transporting rollers 34.

The motor 142 and the motor 112 are connected to the main control section 20 so that the driving action of these motors is controlled by means of the main control section 20.

Figure 7:
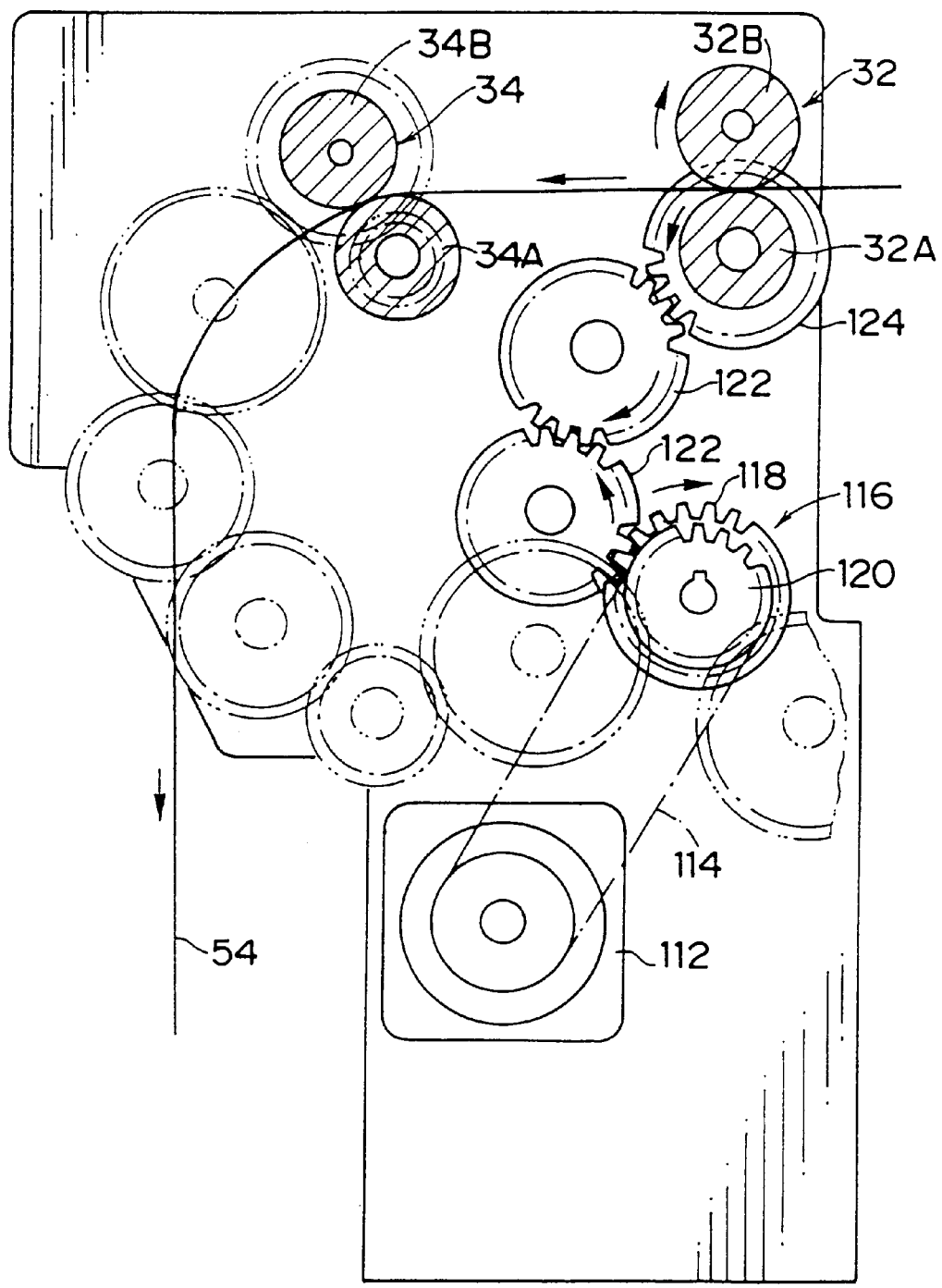
FIG. 7 is an enlarged view of the principal parts of the drive system of the pair of transporting rollers according to an embodiment of the present invention showing the first transporting roller being driven.

With the construction as described above, during automatic loading of the photographic paper 54 from the paper magazine 64 and during the paper replenishment, the gear train 132 is interrupted by means of the electromagnetic clutch 134, so that the second pair of transporting rollers 34 can be freely rotated. Further, as shown in FIG. 7, the first pair of transporting rollers 32 transports the photographic paper 54 from the paper magazine 64 towards the exposure section 26 and 28 by the driving force of the motor 112. At this time, the second pair of transporting rollers 34 disposed between the first pair of transporting rollers 32 and the exposure section 26 and 28 are freely rotated so as to guide the photographic paper 54.

When a reverse transporting operation for rewinding the photographic paper 54 is needed, the clutch 116 and the solenoid of the electromagnetic clutch 134 are simultaneously switched over, so that the driving force of the motor 112 can be transmitted to the second pair of transporting rollers 34 via the second gear 120 and the gear train 132. As a result, the second pair of transporting rollers 34 are rotated by means of the motor 112 while the roller 68A is rotated by means of the motor 142, so that the photographic paper 54 is transported so as to be returned towards the first pair of transporting rollers A cutter 71 is disposed on the downstream side of the roller 68A. The cutter 71 cuts the terminal end of the photographic paper 54 whose exposure process is completed. It is possible to rewind the photographic paper 54, remaining in the exposure room 52, back onto the paper magazine 64, once the processed photographic paper 54 has been cut off by the cutter 71.

More specifically, when rewinding the photographic paper 54 back onto the paper magazine 64, the motor 112 is driven while the clutch 116 is being switched over, and then, the driving force is transmitted to the reel 62 of the paper magazine 64 via the second gear 120 and the magazine gear 126, so that the reel 62 is rotated so as to wind up the photographic paper 54.

At this time, the first pair of transporting rollers 32 and the second pair of transporting rollers do not hinder the winding up of the photographic paper 54 because the clutch 116 is engaged and the clutch 136 is a one way clutch.

Further, a second stock section 73 for guiding the printed photographic paper 54 into a letter U-like shape and stocking it is provided between the roller 68A and the roller 68B. In the second stock section 73, the photographic paper 54 is stocked, and by doing so, any difference in processing time between the printer section 58 and processor section 72 is absorbed.

Next, the structure of the processor section 72 is described.

As shown in FIG. 1, the processor section 72 is provided with a color developing tank 74 in which a color developing liquid is stored, a bleach fixing tank 76 in which a bleach fixing liquid is stored, and a plurality of rinsing tanks 78 in which washing liquid is stored. The photographic paper 54 is transported through these tanks in the order of the color developing tank 74, the bleach fixing tank 76 and the plurality of rinsing tanks 78, and thereby, is successively subjected to developing, fixing, and washing processes. The washed photographic paper 54 is carried to a drying section 80 adjacent to the rinsing tank 78, and thereafter, in the drying section 80, the photographic paper 54 is wound around a roller, and then, is exposed to a high temperature air so as to be dried.

The photographic paper 54 is held between a pair of rollers (not shown), and then, is discharged from the drying section 80 at a fixed speed after drying is completed. A cutter section 84 is provided on the downstream side of the drying section 80. The cutter section 84 is provided with a cut mark sensor 86 for sensing (detecting) a cut mark applied to the photographic paper 54, a paper density measuring section 90 for measuring the density of the photographic paper 54, and a cutter 88 for cutting the photographic paper 54. The cut mark sensor 86, paper density measuring section 90, and cutter 88 are individually connected to the main control section 20. In the cutter section 84, the photographic paper 54 is cut for each image frame, and thus, a photographic print is completed.

The photographic print thus completed is discharged to a sorter section 92, and then, is sorted in the sorter section 92 while predetermined inspection work is being carried out. Through the inspection work, defective prints such as so-called out-of-focus prints can be removed, and thereafter, the non-defective photographic prints are returned to the customer together with the negative film.

Next, the following is a description of an operation of an embodiment of the present invention.

The printer processor 10 of the present embodiment comprises the first exposure section 26 for exposing the images recorded on the negative film 16 onto the long photographic paper 54 fed from the paper magazine 64, and the second exposure section 28 which is situated on the upstream side in the feeding direction of the photographic paper 54 from the first exposure section 26 and which exposes the images stored in the image memory 106 onto the photographic paper 54.

For this reason, the exposure process in the first exposure section 26 of the printer processor 10 will be described below first.

The negative film 16 with images to be printed recorded thereon is set in the negative carrier 18 with the black shutter 50 closed. The light source 38 is then turned on and the density of the image of the negative film 16 imaged by a light transmitted through the negative film 16 is measured by means of the negative density measuring section 56. On the basis of the measured image density of the negative film 16, proper exposure conditions (e.g., the insertion of the filters of the filter section 40) is set by means of the main control section 20. Sequentially, the black shutter 50 is opened, and the images on the negative film 16 are exposed onto the photographic paper 54 on the basis of the preset exposure conditions.

Meanwhile, prior to the exposure process of the negative film 16, automatic loading of the photographic paper 54 is carried out if no photographic paper 54 has been fed into the printer processor 10, or if replenishment of the photographic paper 54 is necessary.

More specifically, as shown in FIG. 7, the first pair of transporting rollers 32 feed the photographic paper 54 from the paper magazine 64 towards the exposure section 26 and 28, and at this time, the photographic paper 54 is guided by the second pair of transporting rollers 34 disposed between the first pair of transporting rollers 32 and the exposure section 26 and 28.

Moreover, when exposing the negative film 16, the images on the negative film 16 imaged by the light transmitted through the negative film 16 are successively scanned by the scanner 108. And then, the scanned image data is stored in the image memory 106 by means of the image signal processing section 102.

Further, once the exposure of a roll of negative film 16 is completed, and thereafter, in the case where an index print is exposed onto the photographic paper 54 as an exposure process in the second exposure section 28, the second exposure optical section 22 reads image data of several frames from the image memory 106, and exposes the data onto the photographic paper 54.

Figure 10:
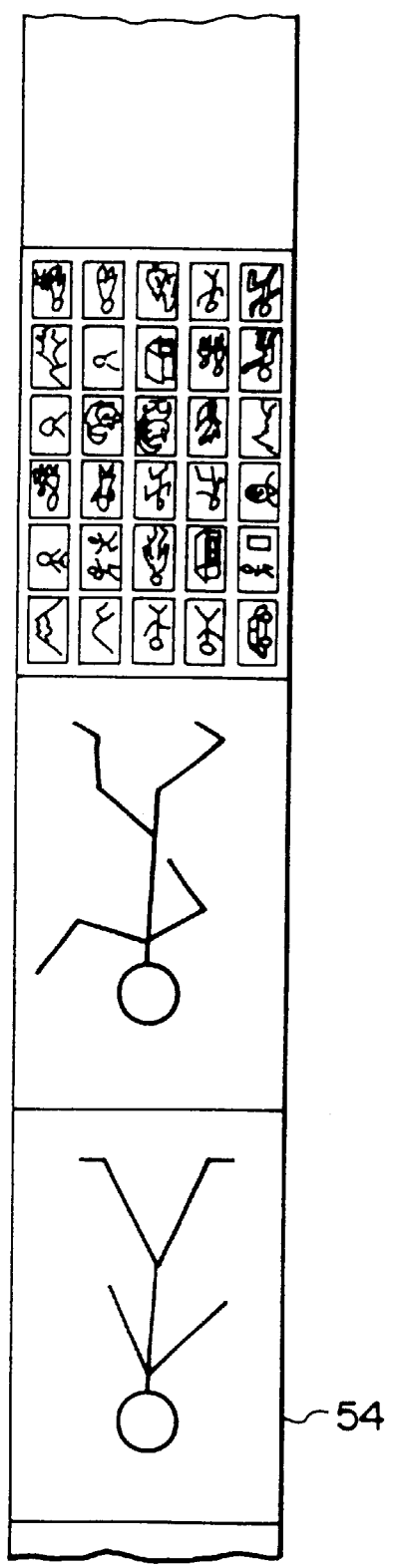
FIG. 10 is a view of the photographic paper on which ordinary prints and an index print are exposed by means of the printer processor according to an embodiment of the present invention.

The above operation is repeated, and thereby, as shown in FIG. 10, the images of the index print to be printed are successively exposed onto the photographic paper 54, and finally, the image frames of the roll of negative film 16 are all exposed onto the photographic paper 54.

In the present embodiment, the printer processor 10 includes the second pair of transporting rollers 34 which are disposed between the paper magazine 64 and the second exposure section 28 and are situated on the upstream side in the transporting direction of the photographic paper 54 from the exposure sections 26 and 28, and the roller 68A which is disposed on the downstream side of the first exposure section 26 and is situated on the downstream side in the transporting direction of the photographic paper 54 from the exposure sections 26 and 28. Further, the nip pressure of the roller 68A and the friction belt 70 is set higher than that of the second pair of transporting rollers 34.

Figure 11:
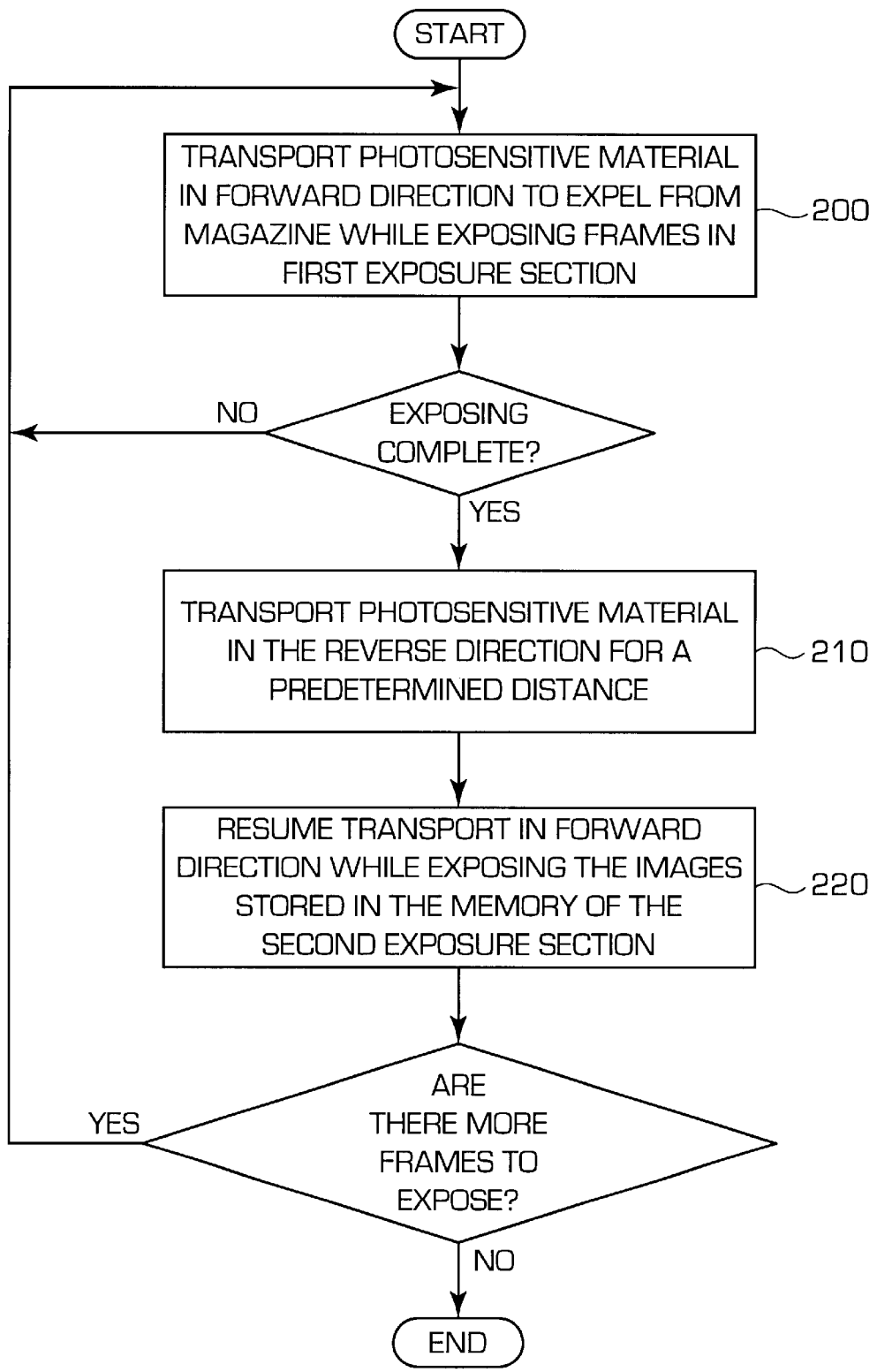
FIG. 11 is a flow chart illustrating the photographic printer exposure method according to the present invention.

Next, the procedures of the exposure process of the present embodiment will be described below in detail with reference to FIG. 11.

First, the photographic paper 54 is transported along the transporting direction thereof, and then, the frames of the roll of negative film 16, on which the images have been recorded up to the final frame thereof, are successively exposed onto the photographic paper 54 in the first exposure section 26 (step 200).

Figure 8:
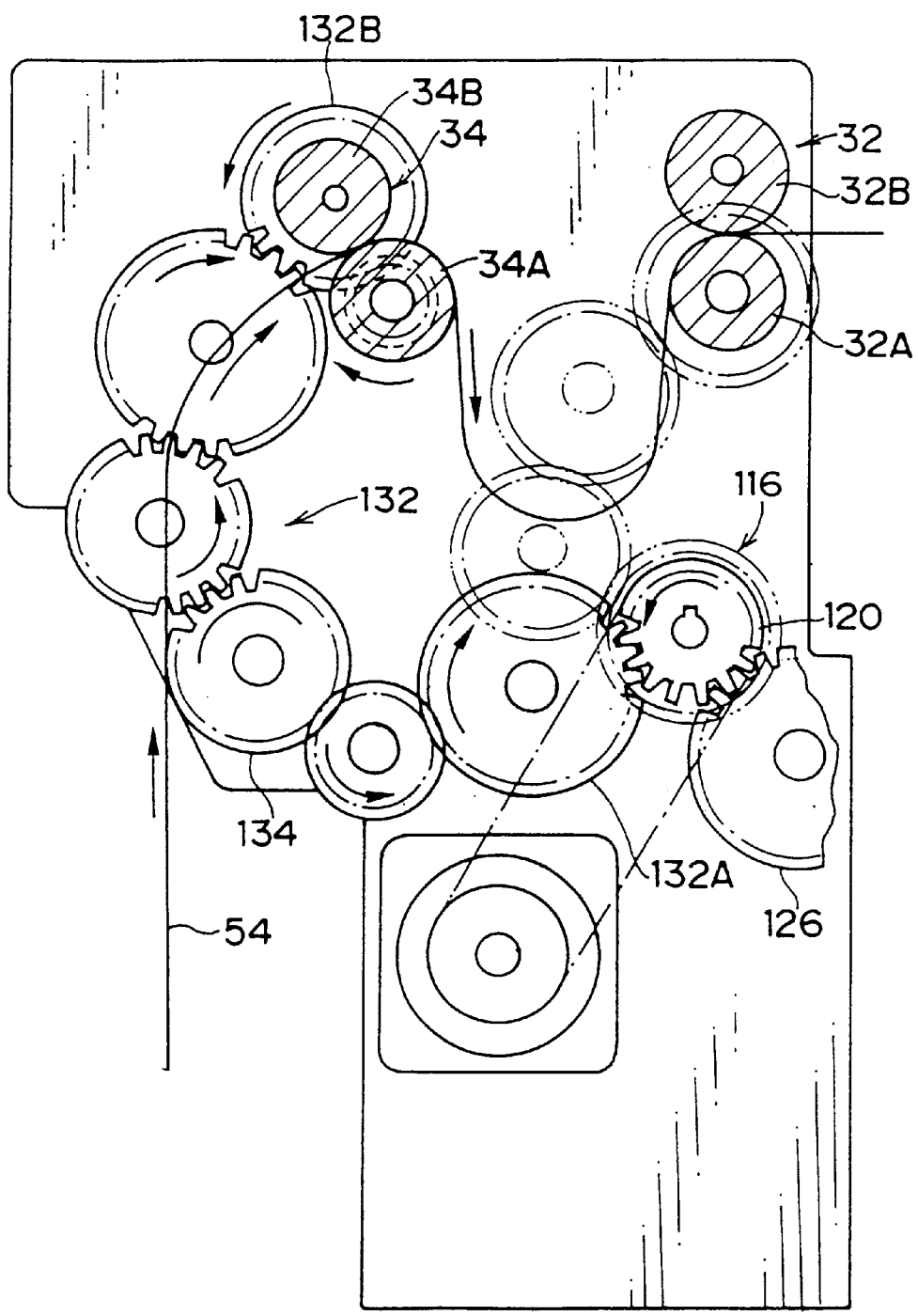
FIG. 8 is an enlarged view of the principal parts of the drive system of the pair of transporting rollers according to an embodiment of the present invention showing the second transporting roller being driven.
Figure 9:
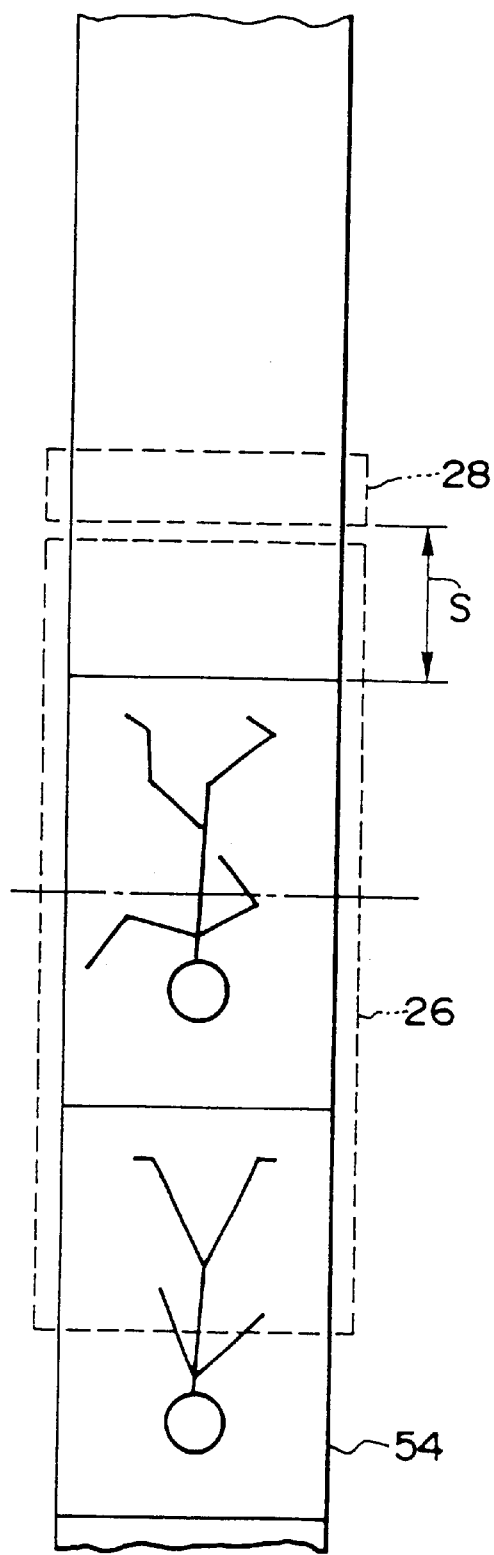
FIG. 9 is a view of the photographic paper on which only ordinary prints are exposed by means of the printer processor according to an embodiment of the present invention.

At this time, as shown in FIG. 9, a space S is formed on the photographic paper 54. In order to prevent the space S from being formed, as shown in FIG. 8, the second pair of transporting rollers 34 are rotated by the motor 112 while the roller 68A shown in FIG. 3 is rotated by the motor 142, so that the photographic paper 54 is transported in the reverse direction to the transporting direction of the photographic paper 54 towards the second exposure section 28 situated on the upstream side in the transporting direction of the photographic paper 54 from the first exposure section 26 (step 210). Thereafter, resume transport of photosensitive material in forward direction while exposing the index print (step 220).

In this case, the driving action of the second pair of transporting rollers 34 starts, and thereafter, when several ten milliseconds have elapsed, the driving action of the roller 68A starts so as to transport the photographic paper 54. Next the roller 68A is stopped once several millimeters of the photographic paper 54 past the space S have gone beyond the second exposure section 28 and then, several ten milliseconds later, the second pair of transporting rollers 34 are stopped thereby stopping the transporting of the photographic paper 54.

As described above, the photographic paper 54 has been excessively transported by several millimeters (mm) past the space S. Further, the photographic paper 54 is transported by the above equivalent length along the original transporting direction due to the rotation of the first pair of transporting rollers 32 and the roller 68A by the motors 112 and 142. Thereafter, as shown in FIG. 10, the images stored in the images memory 106 as described above are exposed as an index print onto the photographic paper 54 next to the final frame in the second exposure section 28.

In this case, no driving force is transmitted to the second pair of transporting rollers 34 by the electromagnetic clutch 134, so that the second pair of transporting rollers 34 is made to idle by the one-way clutch 136.

As described above, the final frame of the negative film 16 is exposed first in the first exposure section 26, and thereafter, it is possible to transport the photographic paper 54 in reverse so that the exposure of the images stored in the image memory 106 is started in the second exposure section 28 without forming a space between the index print and the final frame of the negative film 16. Thus, it is possible to improve the processing performance of the printer processor 10 without wasting the photographic paper 54.

The nip pressure of the roller 68A is set higher than that of the second pair of transporting rollers 34. Further, when the photographic paper 54 is transported in the reverse direction to the original transporting direction, the second pair of transporting rollers 34 starts its driving action prior to the roller 68A, and when the transporting of the photographic paper 54 is stopped, the roller 68A is stopped prior to the second pair of transporting rollers 34. This serves to prevent the photographic paper 54 from becoming loosened, and the photographic paper 54 slides over the second pair of transporting rollers 34, so that no load is applied to the photographic paper 54. Also, by controlling the rotation of the roller 68A, it is possible to control the transporting rate of the photographic paper 54.

Further, because the same length of photographic paper 54 as was transported past the second exposure section is finally transported in the original direction, it is possible to prevent the reverse transporting of the photosensitive material from being lowered due to backlash or the like.

When transporting the photographic paper 54 in the reverse direction to the transporting direction of the photographic paper 54, the second pair of transporting rollers 34 are driven using the motor 112 for automatically loading and replenishing the photographic paper 54 by the first pair of transporting rollers 32, and then, the photographic paper 54 is transported in the reverse direction by the rotation of the second pair of transporting rollers 34. Thus, there is no need to provide an additional motor 112 in order to transport the photographic paper 54 in the reverse direction.

Therefore, there is no need to provide space for an additional motor 112, or a circuit board for controlling the motor 112, so that miniaturization and cost reduction can be achieved in the printer processor 10. Further, since the motor 112 is used as the drive source of the second pair of transporting rollers 34, this facilitates the control for driving the second pair of transporting rollers 34.

In this embodiment, moreover, the gear train 132 for transmitting the driving force from the motor 112 to the second pair of transporting rollers 34 is interposed between the motor 112 and the second pair of transporting rollers 34. Thus, it is possible to readily transmit the driving force to the second pair of transporting rollers 34 without changing the locating position of the motor 112. Further, it is possible to securely transmit the driving force compared with when the driving force is transmitted using a belt.

In this embodiment, an electromagnetic clutch 134 is provided in the gear train 132 so as to arbitrarily interrupt the transmission of the driving force. Thus, it is possible to interrupt the transmission of rotation with the electromagnetic clutch 134 so that the gear train 132 itself does not put any weight on the driving force during automatic loading and the like, that is, when the first pair of transporting rollers 32 feeds the photographic paper 54 from the paper magazine 64 towards the exposure section 26 and 28 side.

Incidentally, if the electromagnetic clutch 134 is set to interlink with the solenoid of the clutch 116, there is no need to add a circuit board for the electromagnetic clutch 134 and modifying software.

Next is a description on the processes executed in the processor section 72.

In the manner as described above, the images to be printed are exposed onto the photographic paper 54, and thereafter, the photographic paper 54 is transport at through the color developing tank 74, the bleach fixing tank 76 and the plurality of rinsing tanks 78 of the processor section 72, in that order, and thereby, developing, fixing, and washing processes are successively carried out on the photographic paper 54. The washed photographic paper 54 is transported to the drying section 80 so as to be dried by high temperature air. The photographic paper 54 thus dried is transported to the cutter section 84, where each, is cut for each image frame by means of the cutter 88, and thus, is made as a photographic print. The photographic prints are then discharged to the sorter section 90, where they are sorted.

In the above embodiment, a pulse motor, for example, may be employed for the motors 112 and 142, but other types of motors may also be employed.

Further, in the above embodiment, a light emitting diode has been used as the light source for the index print exposure of the second exposure optical section 22. The light source 38, which is the light source of the first exposure optical system 46, may be used as the light source.

Furthermore, the above embodiment has given an example in which the present invention is applied to a printer processor having a second exposure optical section. The present invention is also applicable to other photographic print systems, and to a liquid crystal photographic printer having image memory, a liquid crystal panel for displaying image data stored in the image memory and an exposure system for exposing the image displayed on the liquid crystal panel.

As is evident from the above description, according to the present invention, the following effects can be obtained in the photographic printer and the photographic printer exposure method. Namely, it is possible to transport the photosensitive material in a reverse direction using the drive source for automatically loading and rewinding the photosensitive material, so that the processing performance can be improved without wasting the photosensitive material. Further, it is possible to prevent the precision of the transporting of the photosensitive material from being lowered when direction the photosensitive material is being transported in the reverse direction.

What is claimed is:

1. A photographic printer, comprising:
  a first exposure section which exposes images recorded on a negative film onto a long photosensitive material fed from a magazine;
  a second exposure section, situated on the upstream side of said photosensitive material from said first exposure section, which exposes images stored in a memory onto said photosensitive material,
  a drive source, which generates a driving force for feeding said photosensitive material;

a first group of transporting rollers which feed the photosensitive material from a magazine to said exposure sections through said driving force of said drive source;

a second group of transporting rollers arranged between said first group of transporting rollers and said exposure sections so as to hold said photosensitive material, said second group of transporting rollers being driven independently of said first group of transporting rollers by said drive source for reverse transporting of said photosensitive material toward said first group transporting rollers a predetermined distance; and a third group of transporting rollers situated on the downstream side of said photosensitive material from said exposure sections so as to hold the photosensitive material.

2. A photographic printer according to claim 1, wherein the nip pressure between said third group of transporting rollers is higher than the nip pressure of said second group of transporting rollers.

3. A photographic printer according to claim 1, wherein said photographic printer further includes a gear train provided between said drive source and said second group of transporting rollers for transmitting said driving force from said drive source to said second group of transporting rollers.

4. A photographic printer according to claim 3, wherein the nip pressure between said third group of transporting rollers is higher than the nip pressure of said second group of transporting rollers.

5. A photographic printer according to claim 3, wherein said photographic printer further includes a motor for said drive source, and a clutch in said gear train for stopping the transmission of said driving force.

6. A photographic printer according to claim 5, wherein the nip pressure of said third group of transporting rollers is higher than the nip pressure of said second group of transporting rollers.

7. A photographic printer as in claim 1, wherein said second group transporting rollers freely rotate during automatic loading of said photosensitive material.

8. A photographic printer as in claim 1, wherein said third group of transporting rollers situated on the downstream side of said photosensitive material from said exposure sections bi-directionally transport said photosensitive material.

9. A photographic printer comprising:

a first exposure section which exposes images recorded on a negative film onto a long photosensitive material fed from a magazine;

a second exposure section, situated on the upstream side of said photosensitive material from said first exposure section, which exposes images stored in a memory onto said photosensitive material;

an upstream group of transporting rollers situated on the upstream side of said photosensitive material from said exposure sections so as to hold the photosensitive material;

a motor for bi-directionally driving said group of transporting rollers situated on the upstream side of said photosensitive material from said exposure sections; and a downstream group of transporting rollers situated on the downstream side of said photosensitive material from said exposure sections so as to hold the photosensitive material;

wherein the nip pressure between said downstream group of transporting rollers is higher than the nip pressure of said upstream group of transporting rollers.

10. A photographic printer as in claim 9, wherein said downstream group of transporting rollers bi-directionally transport said photosensitive material.

11. A photographic printer exposure method, which is applied to a photographic printer having a first exposure section for exposing images recorded on a negative film onto a long photosensitive material fed from a magazine, and a second exposure section situated on the upstream side of the photosensitive material from said first exposure section which exposes images stored in a memory onto said photosensitive material, comprising the following steps of:

(a) transporting said photosensitive material in a transporting direction so as to expel said photosensitive material from said magazine, while successively exposing frames of a negative film onto said photosensitive material in said first exposure section;

(b) subsequently transporting said photosensitive material in the reverse direction to said transporting direction of step (a) for a predetermined distance in order to position an unexposed region of said photosensitive material, which is adjacent to a region of said photosensitive material exposed in said first exposure section, for exposure by said second exposure section; and (c) exposing said images stored in said memory of said second exposure section onto said unexposed region of said photosensitive material.

12. A photographic printer exposure method, which is applied to a photographic printer having a first exposure section for exposing images recorded on a negative film onto a long photosensitive material fed from a magazine, a second exposure section situated on the upstream side of said photosensitive material from said first exposure section which exposes images stored in a memory onto said photosensitive material, an upstream group of transporting rollers provided between said magazine and said second exposure section, and a downstream group of transporting rollers provided on the downstream side of said photosensitive material from said first exposure section, comprising the steps of:

(a) transporting said photosensitive material in a transporting direction so as to expel said photosensitive material from said magazine, while successively exposing frames of a negative film onto said photosensitive material in said first exposure section;

(b) subsequently transporting said photosensitive material in the reverse direction to said transporting direction of step (a) for a predetermined distance by first driving said upstream group of transporting rollers and thereafter driving said downstream group of transporting rollers, said downstream group of transporting rollers having a nip pressure higher than said upstream group of transporting;

(c) stopping said downstream group of transporting rollers and thereafter stopping said upstream group of transporting rollers to thereby stop the transporting of said photosensitive material;

(d) subsequently resuming transport in said transporting direction of step (a); and (e) exposing said images stored in said memory of said second exposure section onto a region of said photosensitive material adjacent to a region thereof exposed in said first exposure section.

13. A photographic printer, comprising:

a first exposure section for exposing images recorded on a negative film onto a long photosensitive material fed from a magazine;

a second exposure section, situated on the upstream side of said photosensitive material from said first exposure section, for exposing images stored in a memory onto said photosensitive material;

a driving means for transporting said photosensitive material in a forward direction from said second exposure section toward said first exposure section; and a reverse driving means for transporting said photosensitive material a predetermined distance in a reversed direction.

* * * * *